United States Patent [19]

Hoshi

[11] Patent Number: 5,509,397
[45] Date of Patent: Apr. 23, 1996

[54] AIR SUPPLY SYSTEM PREVENTING BACKFLOW

[75] Inventor: Koichi Hoshi, Susono, Japan

[73] Assignee: Toyota Jidosha Kabushiki Kaisha, Toyota, Japan

[21] Appl. No.: 387,304

[22] Filed: Feb. 27, 1995

[30] Foreign Application Priority Data

Mar. 11, 1994 [JP] Japan ................... 6-041344

[51] Int. Cl.⁶ ............................................. F02B 23/00
[52] U.S. Cl. ...................... 123/585; 123/586; 123/587; 123/531
[58] Field of Search ................................ 123/585, 586, 123/587, 531, 525, 526, 527

[56] References Cited

U.S. PATENT DOCUMENTS 5,172,674 12/1992 Horie et al. ........................ 123/585

FOREIGN PATENT DOCUMENTS

4-295178 10/1992 Japan .
6-26426 2/1994 Japan .

*Primary Examiner*—Noah P. Kamen
*Attorney, Agent, or Firm*—Kenyon & Kenyon

[57] ABSTRACT

A fuel injection system for an internal combustion engine having an air supply passage for supplying air to a point close to the fuel injection hole of a fuel injector to realize good atomization of the injected fuel. The system comprises an air supply passage, a control valve arranged therein, an opening passage for opening the air supply passage downstream of said control valve into the atmosphere, and a normally closed valve arranged therein. The normally closed valve is opened when an increased amount of pressure for a predetermined period in the intake passage downstream of the throttle valve becomes larger than a predetermined value. Accordingly, the pressure in the air supply passage does not become lower than that in the intake passage downstream of the throttle valve so that a back-flow of intake air can be prevented.

13 Claims, 7 Drawing Sheets

AIR SUPPLY SYSTEM PREVENTING BACKFLOW

BACKGROUND OF THE INVENTION

1. Field of the Invention

The present invention relates to a fuel injection system for an internal combustion engine, which system has an air supply passage for supplying air to a point close to the fuel injection hole of a fuel injector to realize good atomization of the injected fuel.

2. Description of the Related Art

Japanese Unexamined Patent Publication No. 4-295178 discloses such a fuel injection system, in which the air supply passage has a control valve and is connected to the intake passage upstream of the throttle valve. The air supply passage supplies air to a point close to the fuel injection hole of a fuel injector using the differential pressure between the upstream and downstream sides of the throttle valve in the intake passage. In such differential pressure type air supply passage, the amount of air passing therethrough is controlled by the control valve such that a desired amount of intake air in each engine operating condition is collectively supplied into the cylinder, in addition to the amount of intake air passing through the intake passage.

The intake passage has a relatively large cross section such that a large amount of intake air, during a high engine load period, can pass therethrough. On the other hand, in the air supply passage, the downstream side of the control valve must have a relatively small cross section to realize a speed-up of the air-stream therethrough. Accordingly, when the degree of opening of the throttle valve is rapidly increased, in a sharp acceleration, the pressure in the intake passage downstream of the throttle valve becomes close to atmospheric pressure. At this time, even if the degree of opening of the control valve is rapidly increased, the pressure in the air supply passage downstream of the control valve remains negative for some time. Whereby, the pressure in the intake passage downstream of the throttle valve is higher than in the air supply passage and thus a back-flow of intake air occurs, from the intake passage downstream of the throttle valve to the air supply passage, so that some of the fuel already supplied into the intake passage flows into the air supply passage with the back-flow of intake air. Thus, a desired amount of fuel is not supplied into the cylinder and the air-fuel ratio of the mixture becomes more lean than a desired air-fuel ratio so that a desired engine torque can not be obtained and a purification of exhaust gas in the three-way catalytic converter is deteriorated by the lean mixture.

SUMMARY OF THE INVENTION

Therefore, an object of the present invention is to provide a fuel injection system, for an internal combustion engine having a differential pressure type air supply passage, capable of preventing a back-flow of intake air, including some of injected fuel, from the intake passage to the air supply passage when the pressure in the intake passage downstream of the throttle valve suddenly increases.

According to the present invention there is provided a fuel injection system, for an internal combustion engine, comprising a fuel injector arranged in the intake passage downstream of the throttle valve; an air supply passage for connecting the intake passage upstream of the throttle valve with a point close to the fuel injection hole of the fuel injector; a control valve arranged in the air supply passage and controlling the amount of air passing therethrough; an opening passage for opening the air supply passage downstream of the control valve into the atmosphere; a normally closed valve arranged in the opening passage; and a first control means for opening the normally closed valve when a increased amount of pressure for a predetermined period in the intake passage downstream of the throttle valve becomes larger than a predetermined value.

The present invention will be more fully understood from the description of preferred embodiments of the invention set forth below, together with the accompanying drawings.

DESCRIPTION OF THE PREFERRED EMBODIMENTS

Figure 1:
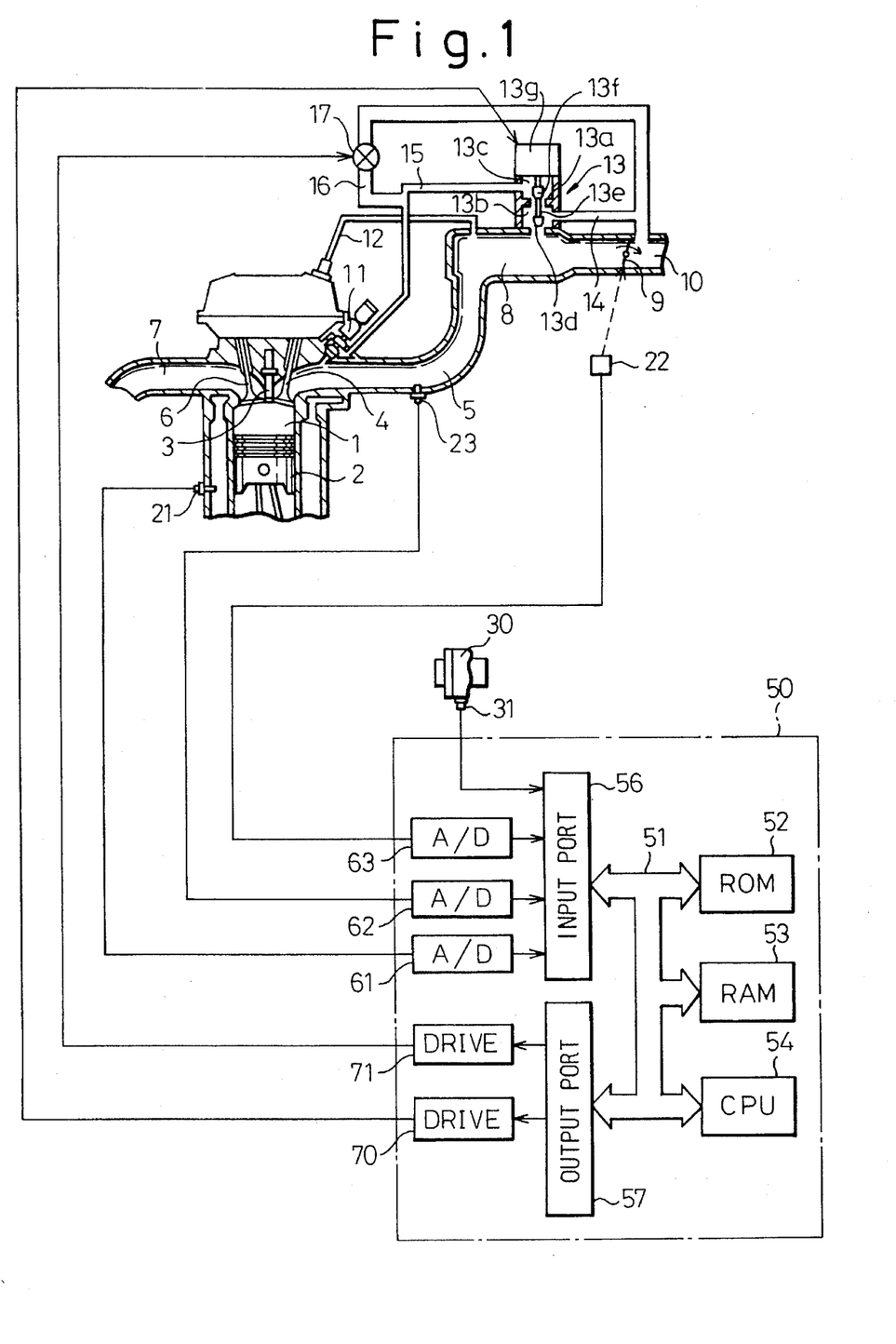
FIG. 1 is a schematic view of an engine having a fuel injection system as a first embodiment of the present invention.

FIG. 1 shows a first embodiment of the present invention. In this figure, reference numeral 1 designates a combustion chamber, 2 a piston, 3 an ignition plug, 4 an intake valve, 5 an intake port, 6 an exhaust valve, and 7 an exhaust port. Each intake port 5 has a relative large cross section such that a large amount of intake air, during a high engine load period, can pass therethrough, and merges into a surge tank 8. An upstream intake passage 10 in which a throttle valve 9 is arranged is connected with the surge tank 8. A fuel injector 11 is arranged in each intake port 5. Reference numeral 12 designates a blowby gas passage for leading blowby gas into the surge tank 8 from the crankcase via the cam cover.

Figure 2:
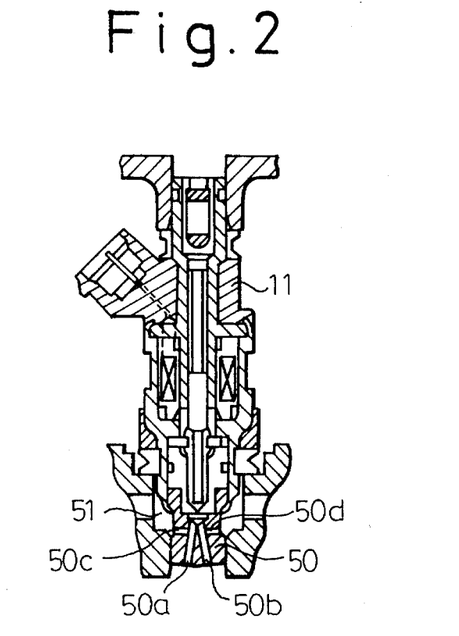
FIG. 2 is a sectional view of the fuel injector in FIG. 1.

FIG. 2 is a sectional view of the fuel injector 11. As shown in this figure, an adapter 50 is mounted on the tip of the fuel injector 11. The adapter 50 has two fuel passages 50a, 50b extending from the two fuel injection holes to the front surface of the adapter 50 along each fuel injecting direction, and at least two air leading passages 50c, 50d for leading air to the fuel passages 50a, 50b at a point close to the fuel injection holes, respectively, from an air chamber 51 formed around the side surface of the adapter 50 in the fuel injector mounting portion. If air is supplied to the air chamber 51, fuel injected by the fuel injector 11 is atomized by air led in the fuel passages 50a, 50b and is supplied from the front surface of the adapter 50 into the intake port 5.

Referring to FIG. 1 again, a control valve assembly 13 is arranged on the outside of surge tank 8. The space inside the control valve assembly 13 is divided into the upstream high pressure chamber 13b and the downstream low pressure chamber 13c by the partition 13a. When the first valve member 13d is opened, the surge tank 8 communicates with the high pressure chamber 13b. When the second valve member 13f is opened, the high pressure chamber 13b communicates with the low pressure chamber 13c. The first and second valve members 13d, 13f are arranged on the valve rod 13e and are actuated by the actuator 13g via the valve rod 13e. The high pressure chamber 13b is connected to the intake passage 10 upstream of the throttle valve 9 by a first connecting pipe 14. The low pressure chamber 13c is connected to the air chamber 51 formed in the fuel injector mounting portion by a second connecting pipe 15.

The second connecting pipe 15 is connected to the intake passage 10 upstream of the throttle valve 9, i.e., it is opened into the atmosphere via the intake passage 10, by an opening passage 16 in which the normally closed valve 17 is arranged.

Reference numeral 50 designates the electronic control unit for controlling the degree of opening of the first and second valve members 13d, 13f of the control valve assembly 13 via the actuator 13g, and for control of the normally closed valve 17 arranged in the opening passage 16. The electronic control unit 50 is constructed as a digital computer and includes a ROM (read only memory) 52, a RAM (random access memory) 53, a CPU (microprocessor, etc.) 54, an input port 56, and an output port 57, which are interconnected by a bidirectional bus 51. A distributor 30 is provided with a crank angle sensor 31 connected to the input port 56. A temperature sensor 21 for detecting the temperature of the engine cooling water as the engine temperature, a throttle sensor 22 for detecting the degree of opening of the throttle valve 9, and a pressure sensor 23 for detecting the pressure in the intake port 5 are also connected to the input port 56 via AD converters 61, 62, and 63, respectively. The output port 57 is connected to the actuator 13g of the control valve assembly 13 via a drive circuit 70. The output port 57 is also connected through a drive circuit 71 to the actuator of the normally closed valve 17.

Figure 3:
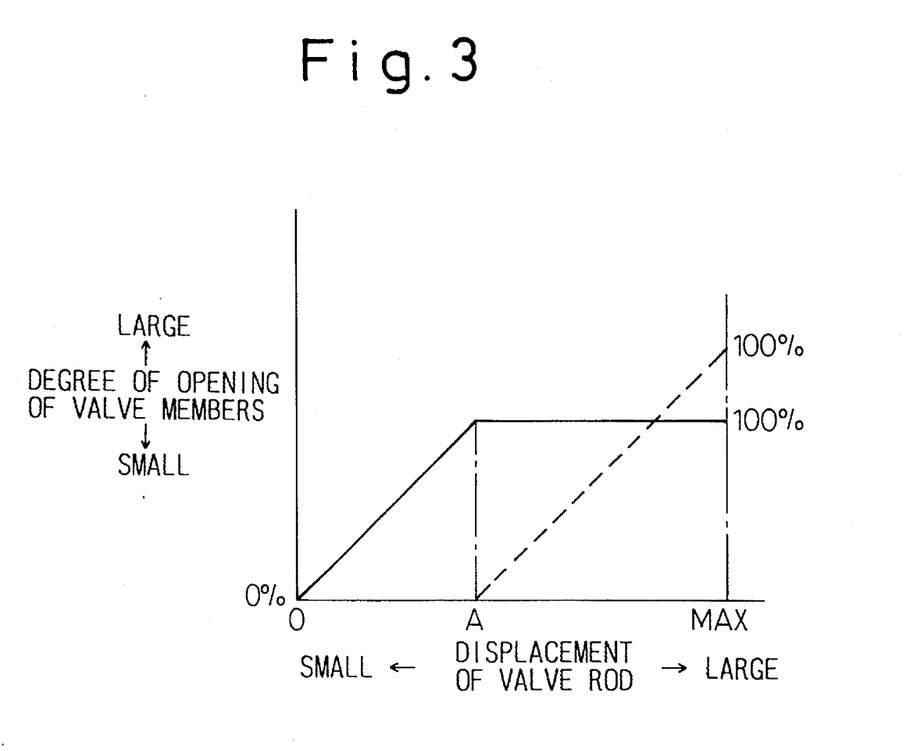
FIG. 3 is a graph showing the degree of opening of the first and the second valve members in accordance with the displacement of the valve rod.

In the control valve assembly 13, the degree of opening of the first and second valve members 13d, 13f changes, as shown in FIG. 3 due to the designed configurations, in accordance with the displacement of the valve rod 13e. In FIG. 3, the solid line shows the degree of opening of the second valve member 13f. When a displacement amount of the valve rod 13e is "0", a degree of opening of the second valve member 13f is "0%", i.e., the second valve member 13f is closed. It increases gradually with increasing displacement amount of the valve rod 13e. When a displacement amount of the valve rod 13e becomes a predetermined amount "A", it becomes "100%", i.e., the second valve member 13f is fully opened. The dotted line shows a degree of opening of the first valve member 13d. A degree of opening of the first valve member 13f is "0%", i.e., the second valve member 13f is closed, until a displacement amount of the valve rod 13e reaches the predetermined amount "A". It increases gradually with increasing displacement amount of the valve rod 13e. It becomes "100%", i.e., the first valve member 13d is fully opened, when a displacement amount of the valve rod 13e becomes the maximum amount "MAX".

Figure 4:
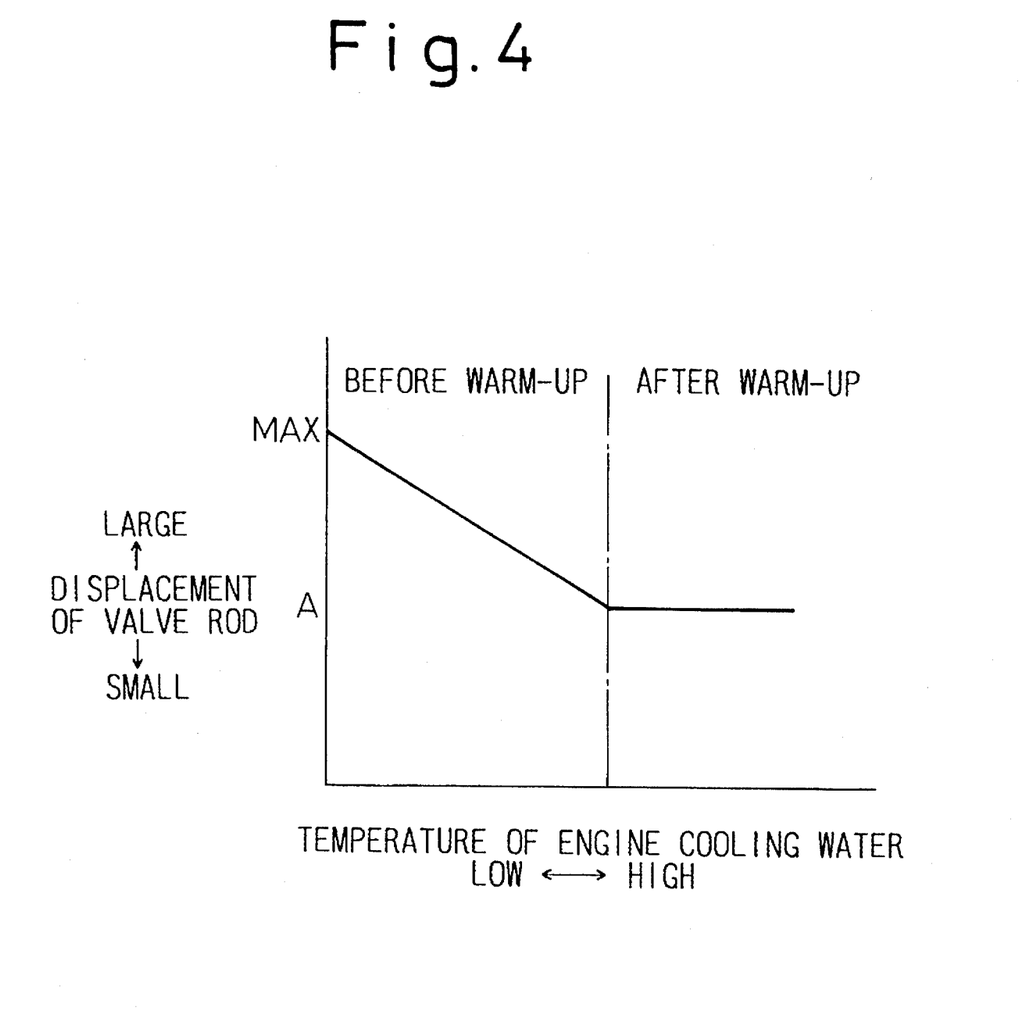
FIG. 4 is a map for controlling the displacement amount of the valve rod in an idle condition.

As shown in FIG. 4, in an idle condition when the engine has not warmed up, the displacement amount of the valve rod 13e is between "A" and "MAX", in accordance with a current temperature of the engine cooling water as detected by the electronic control unit 50. On the other hand, in an idle condition when the engine has warmed up, a displacement amount of the valve rod 13e is made "A" by the electronic control unit 50. Accordingly, in an idle condition when the engine has warmed up, the first valve member 13d is closed and the second valve member 13f is fully opened so that air is supplied into the air chamber 51 by the differential pressure between the upstream and downstream sides of the throttle valve 9 in the intake passage 10, and thus injected fuel is atomized by air and is supplied into the intake port 5 with air. The second connecting pipe 15 has a relative small cross section to realize good atomization of injected fuel as a result of a speed-up of the air-stream therethrough.

On the other hand, in an idle condition when the engine has not warmed up, the first valve member 13d is partly opened and the second valve member 13f is fully opened. Accordingly, as good an atomization of injected fuel can be realized as when the engine has warmed up. In addition, intake air bypassing the throttle valve 9 is supplied into the surge tank 8 via the first valve member 13d so that the amount of intake air increases in contrast to when the engine has warmed up, in spite of holding the degree of opening of the throttle valve 9, and the amount of fuel injected is increased in accordance with an amount of intake air, and thus engine speed is made high to realize a rapid engine warm-up and to stabilize combustion.

In other engine operating conditions, the displacement amount of the valve rod 13e is made between "0" and "A", in accordance with the current engine operating condition, by the electronic control unit 50. Accordingly, the first valve member 13d is closed and the second valve member 13f is partly opened so that a desired amount of air, in each engine operating condition, is supplied into the air chamber 51 by the differential pressure, and thus injected fuel is atomized by air and is supplied into the intake port 5.

Figure 5:
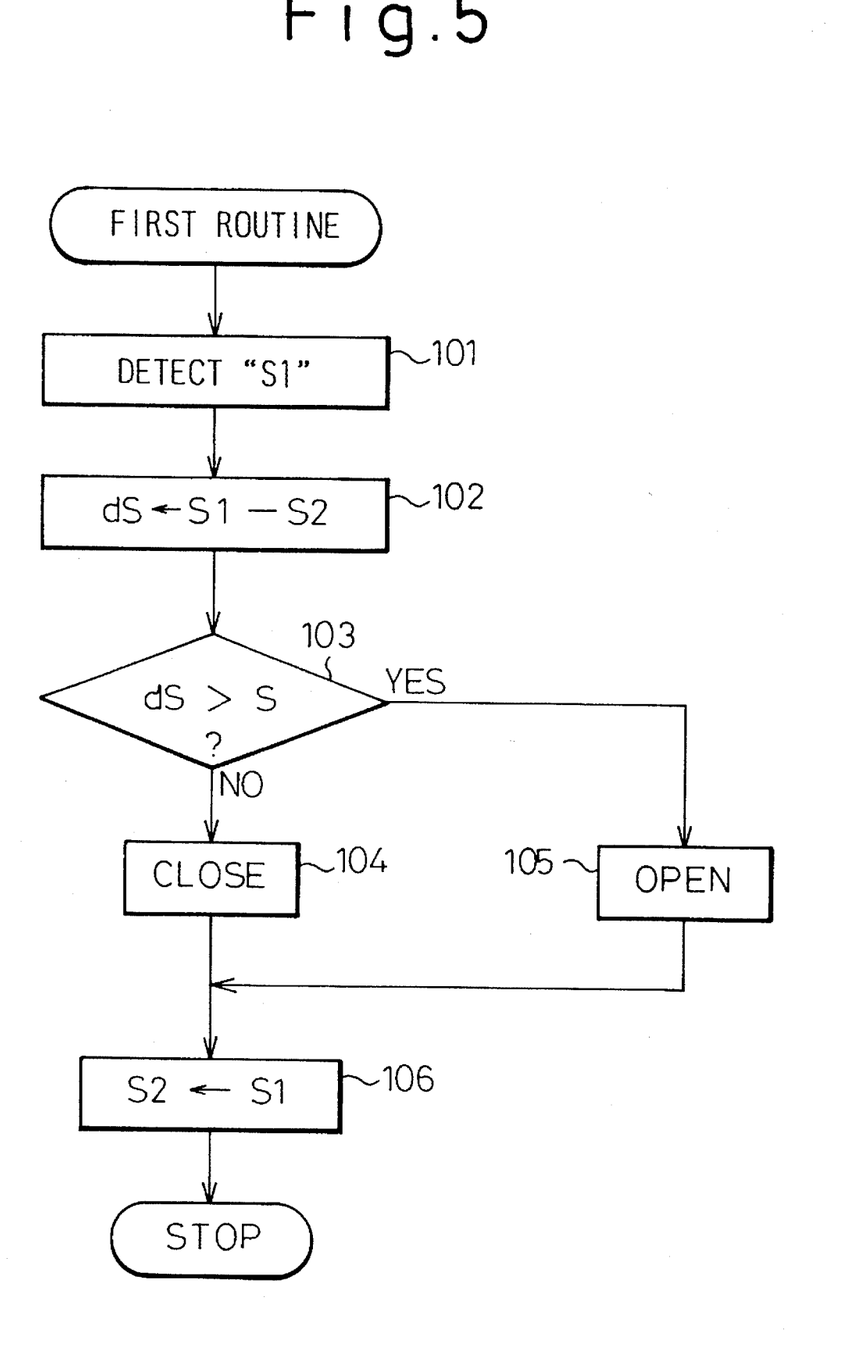
FIG. 5 is a first routine for controlling the normally closed valve.

In addition to such control of the control valve assembly 13, the electronic control unit 50 controls the normally closed valve 17 according to a first routine shown in FIG. 5. Note that the first routine is executed at every predetermined time.

Referring to FIG. 5, at step 101 the current degree of opening "S1" of the throttle valve 9 is detected on the basis of the signal from the throttle sensor 22, and the routine goes to step 102. At step 102, the difference "S1-S2" between the current degree of opening "S1" and the preceding degree of opening "S2" of the throttle valve 9 is calculated as a increased amount of degree of opening "dS" of the throttle valve 9 between this process and the preceding process. Next, at step 103, it is determined if the increased amount of degree of opening "dS" is larger than a predetermined value "S".

When the result is negative, the routine goes to step 104 and the normally closed valve 17 is closed. Next at step 106, the current degree of opening "S1" is shred as the preceding degree of opening "S2" for next process and the routine is stopped.

On the other hand, when the result at step 103 is affirmative, i.e., when the increased amount of degree of opening "dS" of the throttle valve 9 is large so that the pressure in the intake port 5 suddenly increases, the routine goes to step 105 and the normally closed valve 17 is opened. Whereby, the second connecting pipe 15 is opened into the atmosphere via the opening passage 16 and the pressure in the second connecting pipe 16 becomes the same as atmospheric pressure as soon as the normally closed valve 17 is opened, in spite of the relative small cross section thereof.

Accordingly, if the pressure in the intake port 5 reaches atmospheric pressure due to the relative large cross section thereof, the back-flow of intake air including some of the injected fuel does not occur between the intake port 5 and the second connecting pipe 15 because the pressure in the intake port 5 is not higher than in the second connecting pipe 15 so that a desired air-fuel ratio of mixture in the combustion chamber 1 can be realized.

In order that the pressure in the second connecting pipe 15 reaches atmospheric pressure as soon as the normally closed valve 17 is opened, it is preferable that the opening passage 16 has a relative large cross section and is connected to the downstream portion of the second connecting pipe 15, and the normally closed valve 17 has a fast response.

Figure 6:
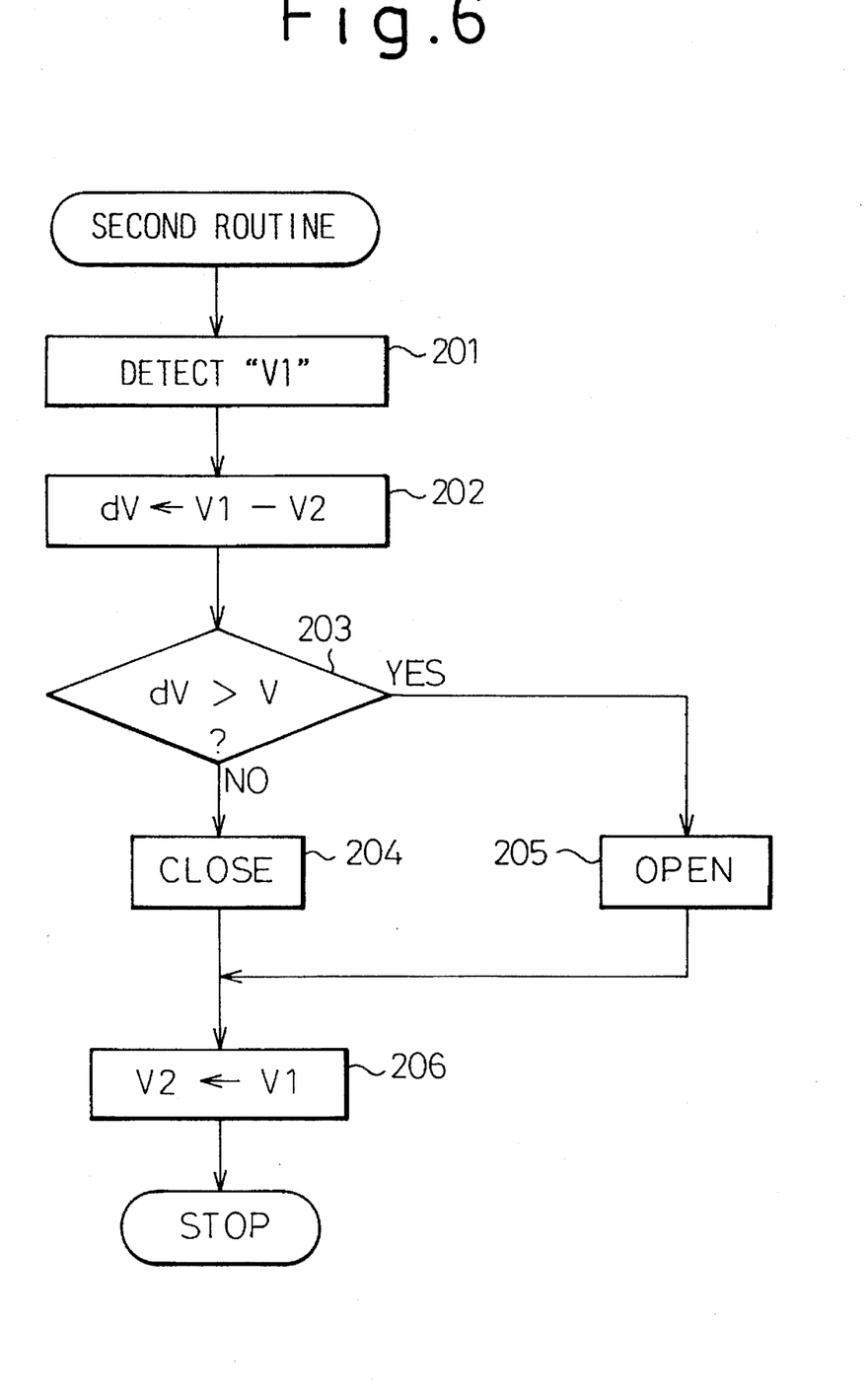
FIG. 6 is a second routine for controlling the normally closed valve.

The electronic control unit 50 may control the normally closed valve 17, according to a second routine shown in FIG. 6. Note that the second routine is executed at every predetermined time.

Referring to FIG. 6, at step 201 a current pressure "V1" in the intake port 5 is detected on the basis of the signal from the pressure sensor 23, and the routine goes to step 202. At step 202, the difference "V1–V2" between the current pressure "V1" and the preceding pressure "V2" in the intake port 5 is calculated, as an increased amount of pressure "dV" between this process and the preceding process. Next, at step 203, it is determined if the increased amount of pressure "dV" is larger than a predetermined value "V".

When the result is negative, the routine goes to step 204 and the normally closed valve 17 is closed. Next at step 206, the current pressure "V1" is stored as the preceding pressure "V2" for next process and the routine is stopped.

On the other hand, when the result at step 203 is affirmative, i.e., when the increased amount of pressure "dV" of the intake port 5 is large so that pressure in the intake port 5 suddenly increases, the routine goes to step 205 and the normally closed valve 17 is opened. In this way, the pressure in the second connecting pipe 16 becomes the same as atmospheric pressure so that the back-flow of intake air is prevented, as in the first routine.

Figure 7:
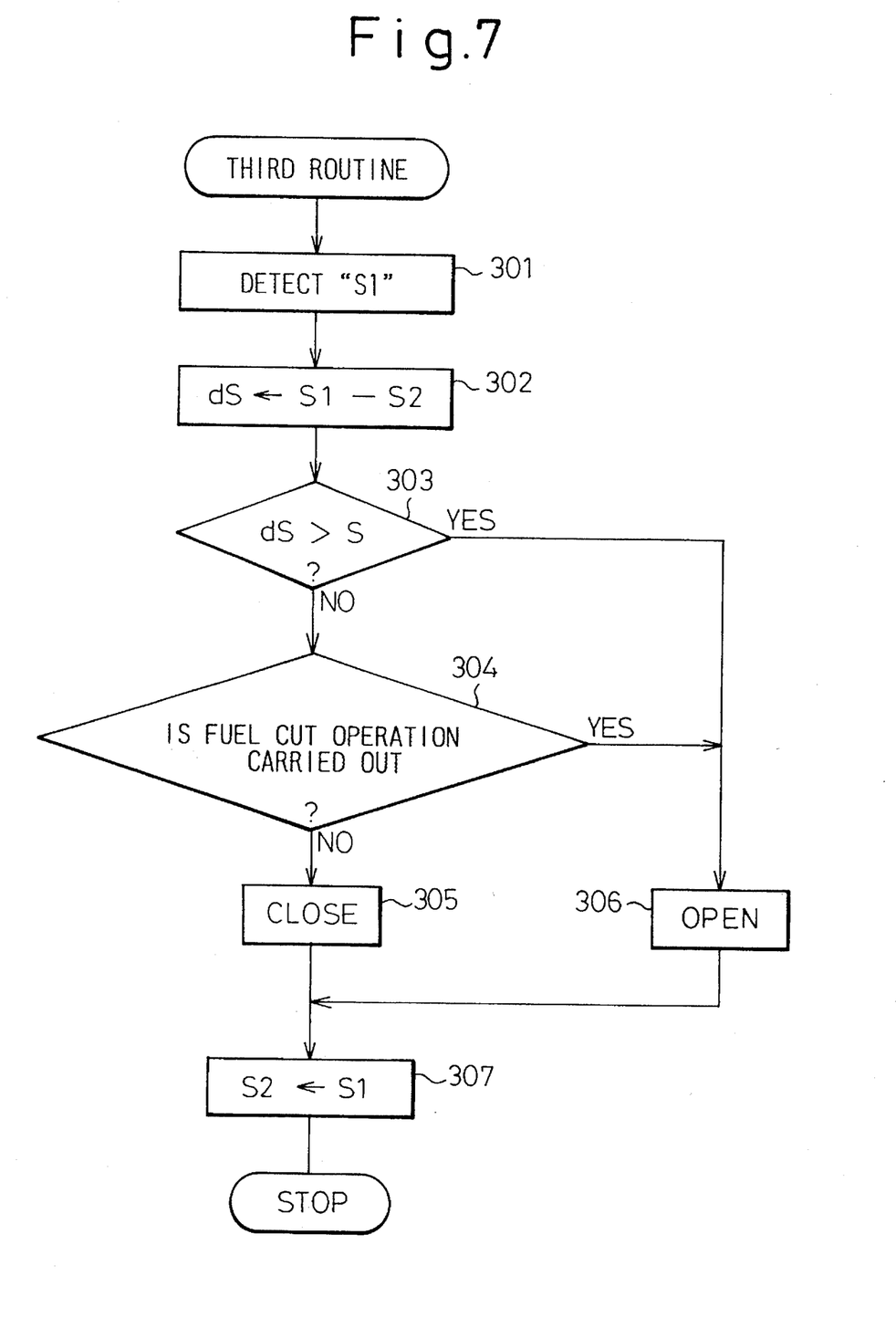
FIG. 7 is a third routine for controlling the normally closed valve.

The electronic control unit 50 may control the normally closed valve 17 according to a third routine shown in FIG. 7. Note that the third routine is executed at every predetermined time. Only the difference between the first and third routine is explained as follows.

In the third routine, step 304 for determining if a fuel cut operation is carried out is added to the first routine. When the result at step 304 is also affirmative, the normally closed valve 17 is opened. The fuel cut operation entails stopping fuel injection, during deceleration and the like, to save fuel.

When a degree of opening of the throttle valve 9 is small during deceleration and the like, the pressure in the intake port 5 becomes very negative. In this case, it is easy to cause an oil loss via the intake valve 4. According to the third routine, when the fuel cut is carried out, the normally closed valve 17 is opened and the pressure in the second connecting pipe 15 becomes the same as atmospheric pressure. In this way, a large amount of air is supplied into the intake port 5, and the pressure in the intake port 5 is raised so that the oil loss is reduced. At this time, the amount of intake air increases considerably, however combustion is not carried out because of the fuel cut so that there is no problem.

In addition, even if fuel flows into the second connecting pipe 15 during sharp acceleration prior to the fuel cut operation, the large amount of air through the second connecting pipe exhausts fuel into the intake port 5 so that corrosion of the second connecting pipe 15 by fuel can be prevented, and it sufficiently cools the fuel injector 11 so that fuel vaporization in the fuel injector 11 can be prevented.

Figure 8:
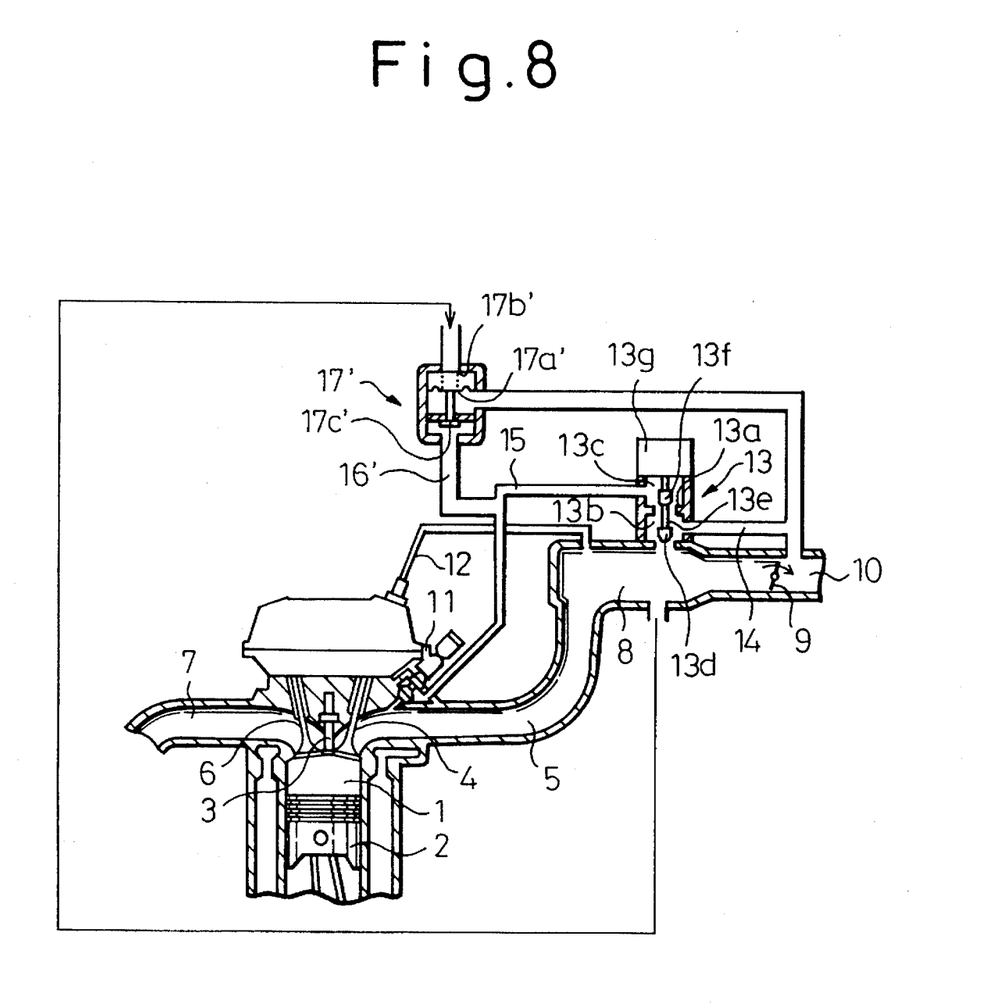
FIG. 8 is a schematic view of an engine having a fuel injection system as a second embodiment of the present invention.

FIG. 8 shows a second embodiment of the present invention. Only the difference between the first and second embodiments is explained, as follows. In the second embodiment, a differential pressure type valve 17' is arranged in the opening passage 16' instead of the normally closed valve 17 in the first embodiment. The inner space in the differential pressure type valve 17' is divided into two chambers by the diaphragm 17a' to which a valve member 17c' for closing the second connecting pipe is attached. The pressure in the intake passage 10 upstream of the throttle valve 9 acts on one of chambers and pressure in the surge tank 8 acts on the other. A differential pressure therebetween biases the diaphragm 17a' toward closing the valve member 17c'. A spring biases the diaphragm 17a' toward opening the valve member 17c'. Accordingly, when a differential pressure is lower than the force of the spring 17b', the diaphragm 17a' is deformed by the spring 17b' so that the valve member 17c' is opened, and thus the second connecting passage 15 is communicated with the intake passage 10 upstream of the throttle valve 9 via the opening passage 16.

The pressure in the intake passage 10 upstream of the throttle valve 9 is the same as atmospheric pressure and is constant. Accordingly, when pressure in the surge tank 8 is higher than pressure set by the spring 17b', the valve member 17c' is opened. The constant of the spring 17b' is selected suitably so that the valve member 17c' is opened in sharp acceleration, and thus the pressure in the second connecting pipe becomes the same as atmospheric pressure. Whereby, the above mentioned problem can be solved as in the first embodiment.

The second embodiment does not need an electronic control unit for the valve 17' so that the construction of the fuel injection system can be made more simple. In addition, when the pressure in the surge tank 8 is higher than the pressure set by the spring 17b', i.e., the degree of opening of the throttle valve 9 becomes large, the valve member 17c' is opened so that the pressure in the second connecting pipe 15 becomes the same as atmospheric pressure in spite of a gentle acceleration. At this time, the amount of air supplied into the intake port 5 from the second connecting pipe 15 increases so that the atomization of the fuel improves.

In the two embodiments, the opening passage 16 or 16' is connected to the intake passage 10 upstream of the throttle valve 9. However, if the opening passage has an air-cleaner, it may directly open into the atmosphere.

Although the invention has been described with reference to specific embodiments thereof, it should be apparent that numerous modifications can be made thereto by those skilled in the art, without departing from the basic concept and scope of the invention.

I claim:

1. An air supply system for preventing backflow in an internal combustion engine, wherein the engine includes an intake passage and a throttle disposed within the intake passage, the fuel injection system comprising:

a fuel injector arranged on the intake passage downstream of the throttle valve, wherein the fuel injector includes a fuel injection hole;

an air supply passage extending from an upstream portion connected to said intake passage upstream of said throttle valve to a downstream portion connected to a point close to the fuel injection hole of said fuel injector;

a control valve arranged in said air supply passage and controlling an amount of air passing therethrough;

an opening passage for connecting said air supply passage downstream of said control valve to the atmosphere;

a normally closed valve arranged in said opening passage; and a first control means for controlling the opening of said normally closed valve, wherein the first control means operates to open the normally closed valve when a pressure increase in said intake passage downstream of said throttle valve during predetermined period becomes larger than a predetermined pressure increase value.

2. An air supply system according to claim 1, wherein the first control means operates to open said normally closed valve when a fuel cut operation is carried out.

3. An air supply system according to claim 1, wherein said first control means comprises a throttle sensor for detecting the degree of opening of said throttle valve to obtain said increased amount of pressure.

4. An air supply system according to claim 1, wherein said first control means comprises a pressure sensor for detecting the pressure in said intake passage downstream of said throttle valve to obtain said increased amount of pressure.

5. An air supply system according to claim 1, wherein the cross section of said opening passage is larger than of said air supply passage.

6. An air supply system according to claim 1, wherein said opening passage is connected to the downstream portion of said air supply passage.

7. An air supply system according to claim 1, wherein said opening passage connects said air supply passage downstream of said control valve to the atmosphere via the intake passage upstream of said throttle valve.

8. An air supply system for preventing back flow in an internal combustion engine, wherein the engine includes an intake passage and a throttle disposed within the intake passage, the fuel injection system comprising:

a fuel injector arranged on the intake passage downstream of the throttle valve, wherein the fuel injector includes a fuel injection hole;

an air supply passage extending from an upstream portion connected to said intake passage upstream of said throttle valve to a downstream portion connected to a point close to the fuel injection hole of said fuel injector;

a control valve arranged in said air supply passage and controlling an amount of air passing therethrough;

an opening passage for connecting said air supply passage downstream of said control valve to the atmosphere;

a normally closed valve arranged in said opening passage; and a valve control means for opening said normally closed valve when the pressure in said intake passage downstream of said throttle valve becomes larger than a predetermined value.

9. An air supply system according to claim 8, wherein the cross section of said opening passage is larger than of said air supply passage.

10. An air supply system according to claim 8, wherein said opening passage is connected to the downstream portion of said air supply passage.

11. An air supply system according to claim 8, wherein said opening passage connects said air supply passage downstream of said control valve to the atmosphere via the intake passage upstream of said throttle valve.

12. An air supply system according to claim 8, wherein said valve control means opens said normally closed valve by using a differential pressure between the upstream and downstream sides of said throttle valve in said intake passage.

13. An air supply system according to claim 12, wherein said valve control means comprises a diaphragm to which said normally closed valve is attached; two chambers divided by said diaphragm, one of which is connected to said intake port upstream of said throttle valve, the other of which is connected to said intake port downstream of said throttle valve; and a spring biasing said diaphragm toward opening said normally closed valve against a differential pressure between the two chambers.

* * * * *

UNITED STATES PATENT AND TRADEMARK OFFICE
CERTIFICATE OF CORRECTION

PATENT NO. : 5,509,397
DATED : April 23, 1996
INVENTOR(S) : Koichi Hoshi

It is certified that error appears in the above-indentified patent and that said Letters Patent is hereby corrected as shown below:

Column 4, line 53, change "schred" to --stored--.

Signed and Sealed this

Twenty-seventh Day of August, 1996

Attest:

BRUCE LEHMAN

Attesting Officer     Commissioner of Patents and Trademarks